(12) United States Patent
Levine et al.

(10) Patent No.: US 9,462,026 B2
(45) Date of Patent: Oct. 4, 2016

(54) COMMUNICATING MULTIMEDIA DATA

(71) Applicants: Scott Levine, Basking Ridge, NJ (US); Sandor Bondorowsky, Montclair, NJ (US)

(72) Inventors: Scott Levine, Basking Ridge, NJ (US); Sandor Bondorowsky, Montclair, NJ (US)

(73) Assignee: SENZA TECH, LLC, Basking Ridge, NJ (US)

( * ) Notice: Subject to any disclaimer, the term of this patent is extended or adjusted under 35 U.S.C. 154(b) by 193 days.

(21) Appl. No.: 14/541,817

(22) Filed: Nov. 14, 2014

(65) Prior Publication Data

US 2016/0036884 A1 Feb. 4, 2016

Related U.S. Application Data

(60) Provisional application No. 62/031,836, filed on Jul. 31, 2014.

(51) Int. Cl.
*H04L 29/06* (2006.01)
*H04L 29/08* (2006.01)

(52) U.S. Cl.
CPC ......... *H04L 65/602* (2013.01); *H04L 65/1069* (2013.01); *H04L 65/4076* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 6,498,893 | B1 * | 12/2002 | Suenaga | H04N 5/76 386/235 |
| 8,739,037 | B1 * | 5/2014 | Hoffman | G06Q 30/00 715/706 |
| 2001/0014206 | A1 * | 8/2001 | Artigalas | G11B 27/032 386/291 |
| 2003/0011714 | A1 * | 1/2003 | Nevins, Jr. | H04N 5/4401 348/589 |
| 2003/0041334 | A1 * | 2/2003 | Lu | H04L 29/06027 725/113 |
| 2003/0177492 | A1 * | 9/2003 | Kanou | H04N 5/44543 725/39 |
| 2004/0008198 | A1 * | 1/2004 | Gildred | G06T 15/005 345/419 |
| 2004/0261033 | A1 * | 12/2004 | Mabon | G06Q 10/00 715/751 |
| 2005/0060369 | A1 * | 3/2005 | Cunningham | H04L 12/1822 709/204 |
| 2005/0278618 | A1 * | 12/2005 | Ogikubo | G11B 27/034 715/255 |
| 2006/0215988 | A1 * | 9/2006 | Tol | G11B 27/034 386/292 |
| 2007/0223887 | A1 * | 9/2007 | Kanamori | G06T 3/4053 386/232 |
| 2009/0100098 | A1 * | 4/2009 | Feher | G06F 17/30017 |

* cited by examiner

*Primary Examiner* — Ninos Donabed
(74) *Attorney, Agent, or Firm* — F. Chau & Associates, LLC

(57) ABSTRACT

A method of communicating multimedia data includes establishing a first connection between a transmitter unit and an administration server, establishing a second connection between a receiver unit and the administration server, assigning a same unique communication channel to the transmitter unit and the receiver unit by the administration server, establishing a third connection between the transmitter unit and the receiver unit using the same unique communication channel upon the first and second connections being established, and transmitting the multimedia data from the transmitter unit to the receiver unit via the third connection. The transmitter and receiver units respectively have unique identification codes that uniquely identify the units from other units connected to the administration server. The communication channel is assigned using the unique identification codes. The transmitter and receiver units respectively automatically initiate establishing the first and second connections upon being connected to the Internet.

20 Claims, 10 Drawing Sheets

FIG. 4B

COMMUNICATING MULTIMEDIA DATA

CROSS-REFERENCE TO RELATED APPLICATIONS

This application claims priority to and the benefit of Provisional Application Ser. No. 62/031,836, filed on Jul. 31, 2014, the disclosure of which is herein incorporated by reference in its entirety.

BACKGROUND

1. Technical Field

Exemplary embodiments of the present invention relate to communicating multimedia data, and more particularly, to a system and method of communicating high quality multimedia data via a public Internet connection.

2. Discussion of Related Art

Due to factors such as, for example, non-standard pixel size, bandwidth limitations, and latency limitations, an Internet connection is typically not used to transmit high quality multimedia data in a professional broadcast environment. Rather, to achieve high quality, low latency transmission of multimedia data, professional broadcasters have traditionally relied on satellite technology, which may be both expensive and complicated.

For example, consider an exemplary scenario in which a television program being produced for live broadcast involves an interviewer located in New York interviewing a guest located in Cleveland. Using current commonly used broadcasting technology, a location survey would first have to be performed at the office building in Cleveland to determine a location to park a satellite truck. The chosen location must permit the satellite truck to have a sufficient line-of-sight to communicate with a particular satellite that can be utilized by the broadcaster. The satellite truck may originate from out of town, and the satellite operator(s) may have to be lodged near the office building. The satellite truck requires external power, which is received either from the office building or a generator that must be brought to the office building. In addition, the audio/video cables must be passed through from the floor of the office building at which the guest is located to the ground floor, passing through stairwells, fire doors, etc. The same or similar obstacles may also be present at the location in New York.

SUMMARY

According to an exemplary embodiment of the present invention, a method of communicating multimedia data includes establishing a first connection between a transmitter unit and an administration server. The transmitter unit automatically initiates establishing the first connection upon being connected to an Internet. The transmitter unit has a first unique identification (ID) code that uniquely identifies the transmitter unit from other units connected to the administration server. The method further includes establishing a second connection between a receiver unit and the administration server. The receiver unit automatically initiates establishing the second connection upon being connected to the Internet. The receiver unit has a second unique ID code that uniquely identifies the receiver unit from the other units connected to the administration server. The method further includes assigning a same unique communication channel to the transmitter unit and the receiver unit, by the administration server, using the first and second unique ID codes. The method further includes establishing a third connection between the transmitter unit and the receiver unit using the same unique communication channel, by the administration server, upon the first and second connections being established. The method further includes transmitting the multimedia data from the transmitter unit to the receiver unit via the third connection.

In an exemplary embodiment, the method further includes configuring transmission properties, by the administration server, for transmitting the multimedia data from the transmitter unit to the receiver unit, capturing the multimedia data via a capture device connected to an audio/video input interface of the transmitter unit, and displaying the multimedia data via a display device connected to an audio/video output interface of the receiver unit. The multimedia data is transmitted from the transmitter unit to the receiver unit via the third connection in accordance with the configured transmission properties.

In an exemplary embodiment, configuring the transmission properties is based on a quality of the first connection and a quality of the second connection.

In an exemplary embodiment, configuring the transmission properties is based on pre-set transmission settings relating to the multimedia data.

In an exemplary embodiment, the method further includes initiating a first network status test corresponding to the first connection, automatically by the administration server, upon establishing the first connection, and initiating a second network status test corresponding to the second connection, automatically by the administration server, upon establishing the second connection.

In an exemplary embodiment, configuring the transmission properties is based on the first and second network status tests.

In an exemplary embodiment, configuring the transmission properties includes at least one of setting a starting bitrate of the multimedia data, setting a minimum bitrate of the multimedia data, setting a maximum bitrate of the multimedia data, setting a compression type of the multimedia data, and setting a maximum latency value of the multimedia data.

In an exemplary embodiment, the first network status test indicates to the administration server a first Internet connection speed currently available to the transmitter unit, and the second network status test indicates to the administration server a second Internet connection speed currently available to the receiver unit.

In an exemplary embodiment, the first network status test indicates to the administration server whether access to any communication ports relating to the first connection is prohibited to the transmitter unit, and whether access to any communication ports relating to the second connection is prohibited to the receiver unit.

In an exemplary embodiment, the capture device and the display device are respectively connected to the transmitter unit and the receiver unit via one of a high-definition serial digital interface (HD-SDI) connection and a high-definition multimedia interface (HDMI) connection.

In an exemplary embodiment, the third connection is automatically established without intervention of a first user of the transmitter unit and a second user of the receiver unit.

In an exemplary embodiment, the transmitter unit automatically initiates establishing the first connection in response to a first network cable being plugged into a first network connection interface of the transmitter unit, and the receiver unit automatically initiates establishing the second connection in response to a second network cable being plugged into a second network connection interface of the receiver unit.

In an exemplary embodiment, the same unique communication channel is assigned to the transmitter unit and the receiver unit prior to establishing the first and second connections.

In an exemplary embodiment, the same unique communication channel is assigned to the transmitter unit and the receiver unit at substantially a same time as establishing the first and second connections.

In an exemplary embodiment, the method further includes initiating a timer, at the administration server, that tracks an amount of time that the multimedia data is transmitted from the transmitter unit to the receiver unit.

In an exemplary embodiment, the method further includes pre-setting a start time and an end time for transmitting the multimedia data from the transmitter unit to the receiver unit.

In an exemplary embodiment, the receiver unit is a first receiver unit, and the method further includes transmitting the multimedia data to the first receiver unit at a first time, and transmitting the multimedia data to a second receiver unit at a second time, different from the first time.

According to an exemplary embodiment of the present invention, a system of communicating multimedia data includes a transmitter unit, a receiver unit and an administration server. The transmitter unit has a first unique identification (ID) code that uniquely identifies the transmitter unit from other units connected to an administration server. The transmitter unit includes an audio/video input interface configured to connect to a capture device configured to capture the multimedia data, an encoder configured to encode the multimedia data, and a first network adapter configured to establish a first connection between the transmitter unit and the administration server. The transmitter unit is configured to automatically establish the first connection upon the first network adapter being connected to an Internet. The receiver unit has a second unique ID code that uniquely identifies the receiver unit from the other units connected to the administration server. The receiver unit includes an audio/video output interface configured to connect to a display device configured to display the multimedia data, a decoder configured to decode the multimedia data, and a second network adapter configured to establish a second connection between the receiver unit and the administration server. The receiver unit is configured to automatically establish the second connection upon the second network adapter being connected to the Internet. The administration server is configured to assign a same unique communication channel to the transmitter unit and the receiver unit using the first and second unique ID codes, and establish a third connection between the transmitter unit and the receiver unit using the same unique communication channel upon the first and second connections being established. The multimedia data is transmitted from the transmitter unit to the receiver unit via the third connection.

In an exemplary embodiment, the administration server is further configured to configure transmission properties for transmitting the multimedia data from the transmitter unit to the receiver unit. The multimedia data is transmitted from the transmitter unit to the receiver unit via the third connection in accordance with the configured transmission properties.

BRIEF DESCRIPTION OF THE DRAWINGS

The above and other features of the present invention will become more apparent by describing in detail exemplary embodiments thereof with reference to the accompanying drawings, in which:

FIGS. 4A-4F show different pages of a dashboard of an administration server according to exemplary embodiments of the present invention.

DETAILED DESCRIPTION OF THE EXEMPLARY EMBODIMENTS

Figure 1:
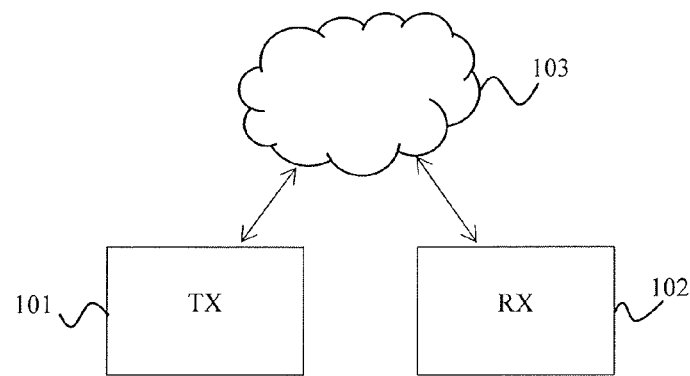
FIG. 1 shows an overview of a communications system according to an exemplary embodiment of the present invention.

Exemplary embodiments of the present invention will be described more fully hereinafter with reference to the accompanying drawings. Like reference numerals may refer to like elements throughout the accompanying drawings.

Exemplary embodiments of the present invention provide a communications system capable of transmitting and receiving high quality multimedia data via a public, unmanaged Internet connection. Additional exemplary embodiments provide a communications system capable of transmitting and receiving high quality multimedia data via a local area network (LAN) without the utilization of a public Internet connection. The communications system includes plug and play devices (e.g. plug and play transmitter and receiver units) configured to communicate multimedia data via an unmanaged public Internet connection (or a LAN), as well as an administration server (e.g., a cloud server) configured to automatically facilitate the transmission of the multimedia data and manage transmission properties of the multimedia data. The communications system provides broadcast quality, high-resolution video with low latency. For example, exemplary embodiments of the present invention facilitate the transmission of high-definition (HD) video including, for example, HD video formats including, but not limited to 720i, 720p, 1080i and 1080p. Exemplary embodiments also facilitate the transmission of standard-definition (SD) video at lower resolutions. Exemplary embodiments support a plurality of video standards and video resolutions used in a variety of different locations including, for example, standards and resolutions commonly used in the United States, Europe, etc. Herein, communicating data refers to transmitting and/or receiving data, and multimedia data refers to audio and/or video data.

Exemplary embodiments of the present invention provide a user friendly system and method to communicate high quality multimedia data without user intervention. For example, according to exemplary embodiments, users are given the ability communicate high quality multimedia data by merely powering on a transmitter and receiver unit and connecting the transmitter and receiver unit to an Internet connection—no other user intervention on the part of the users using the transmitter and receiver units is required to establish a connection between the units. Once powered on and connected to the Internet, the transmitter and receiver units automatically establish a connection to the administration server, and the administration server automatically facilitates the connection between the units and manages transmission properties of the multimedia data being communicated between the units. For example, in an exemplary scenario, transmitter and receiver units may be shipped to customers by common carrier. Once received, the units are powered on, connected to the Internet, and connected to a video source or display device by the customers (e.g., the transmitter unit is connected to a video source and the receiver unit is connected to a display device). Once connected to the Internet, the units will automatically initiate establishing a connection with the administration server, which remotely manages the communication of multimedia data between the units. Thus, exemplary embodiments provide integrated devices requiring no additional add-ons, and that can be setup and utilized by customers having little or no technical expertise.

Although exemplary embodiments of the present invention are described herein with reference to being used in a professional broadcast setting, it is to be understood that the exemplary embodiments are not limited thereto. For example, exemplary embodiments may be utilized in any setting in which high quality multimedia data is being communicated between devices including, for example, in a corporate use setting, in a home use setting, etc.

FIG. 1 shows an overview of a communications system according to an exemplary embodiment of the present invention.

As shown in FIG. 1, in an exemplary embodiment, a communications system includes a transmitter unit 101, a receiver unit 102, and an administration server 103. In an exemplary embodiment, the transmitter unit 101 and the receiver unit 102 communicate data with each other via the administration server 103 using an Internet connection. The transmitter unit 101, the receiver unit 102, and the administration server 103 may be disposed at different locations. For example, the transmitter unit 101 may be connected to a capture device (e.g., an audio/video source) located at a transmission site, the receiver unit 102 may be connected to a display device located at a reception site, and the administration server 103 may be disposed at a location different from the transmission site and the reception site. Alternatively, some or all of the transmitter unit 101, the receiver unit 102 and the administration server 103 may disposed at the same location. The transmitter unit 101, the receiver unit 102, and the administration server 103 are described in further detail below. Herein, a user managing the administration server 103 may be referred to as an administrator, and users located at the transmission and reception sites using the transmitter and receiver units 101 and 102 may be referred to as clients/customers.

Figure 2:
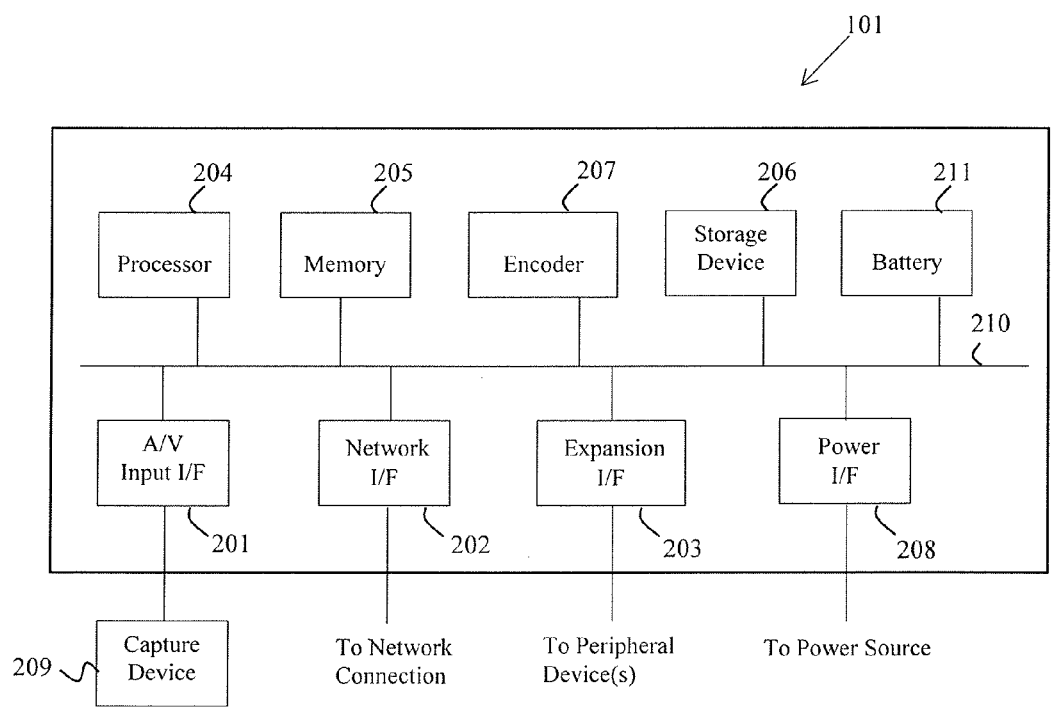
FIG. 2 is a block diagram showing a transmitter unit according to an exemplary embodiment of the present invention.

FIG. 2 is a block diagram showing the transmitter unit according to an exemplary embodiment of the present invention.

Referring to FIG. 2, the transmitter unit 101 includes various connection interfaces and components. It is to be understood that the transmitter unit 101 may include some or all of the connection interfaces and components described herein, as well as additional connection interfaces and/or components. For example, the transmitter unit 101 may include an audio/video input interface 201, a network connection interface 202, and/or an expansion interface 203.

The audio/video input interface 201 may include a single connection port capable of receiving both a video signal and an audio signal, or may include a plurality of connection ports configured to separately receive a video signal and an audio signal. The audio/video input interface 201 may include a standardized connection port(s), allowing the transmitter unit 101 to be connected to a standard capture device 209 to receive multimedia data, resulting in a high level of compatibility both in the United States and abroad. For example, the audio/video input interface 201 may include a serial digital interface (SDI) port such as a high-definition serial digital interface (HD-SDI) port, allowing the transmitter unit 101 to be connected to broadcast industry standard video cameras that output an HD-SDI signal, which may include both a video signal and an audio signal. The audio/video input interface 201 may further include a high-definition multimedia interface (HDMI) port, allowing the transmitter unit 101 to be connected to a variety of devices that output an HDMI signal, which may include both a video signal and an audio signal. The audio/video input interface 201 may further include, for example, a video graphics array (VGA) port, a digital visual interface (DVI) port, component video ports, and/or RCA audio/video ports, although the audio/video input interface 201 is not limited thereto.

The network connection interface 202 may include an Ethernet port and/or a wireless network connection interface (e.g., utilizing the 802.11 standard), allowing the transmitter unit 101 to connect to the Internet and/or to a local area network (LAN) via a wired connection or wirelessly.

The expansion interface 203 may include a variety of communication ports allowing the transmitter unit 101 to connect to various peripheral devices. For example, the expansion interface 203 may include a universal serial bus (USB) port allowing the transmitter unit 101 to connect to a computing device, and/or an XLR port allowing the transmitter unit 101 to connect to professional audio/video equipment. The expansion interface 203 may be utilized, for example, to implement interruptible foldback (IFB) during transmission. The utilization of IFB in exemplary embodiments of the present invention is described below.

The transmitter unit 101 further includes a processor 204, a memory 205, a storage device 206 and/or an encoder 207. The processor 204, memory 205 and storage device 206 are utilized to implement a communications program to communicate the multimedia data, as described in further detail below. The encoder 207 encodes the multimedia data received from the capture device 209 via the audio/video input interface 201. Once encoded, the multimedia data may be transmitted from the transmitter unit 101 to the receiver unit 102 via the network connection interface 202.

The transmitter unit 101 further includes a power interface 208. The power interface 208 is configured to receive power from a standard AC power source, including, for example, power sources having a voltage output between 100 V and 240 V and a frequency between 50 Hz and 60 Hz, allowing the transmitter unit 101 to be operated in any country. The transmitter unit 101 may also receive power via a battery 211. The components of the transmitter unit 101 are connected to and communicate with each other via a bus 210.

Figure 3:
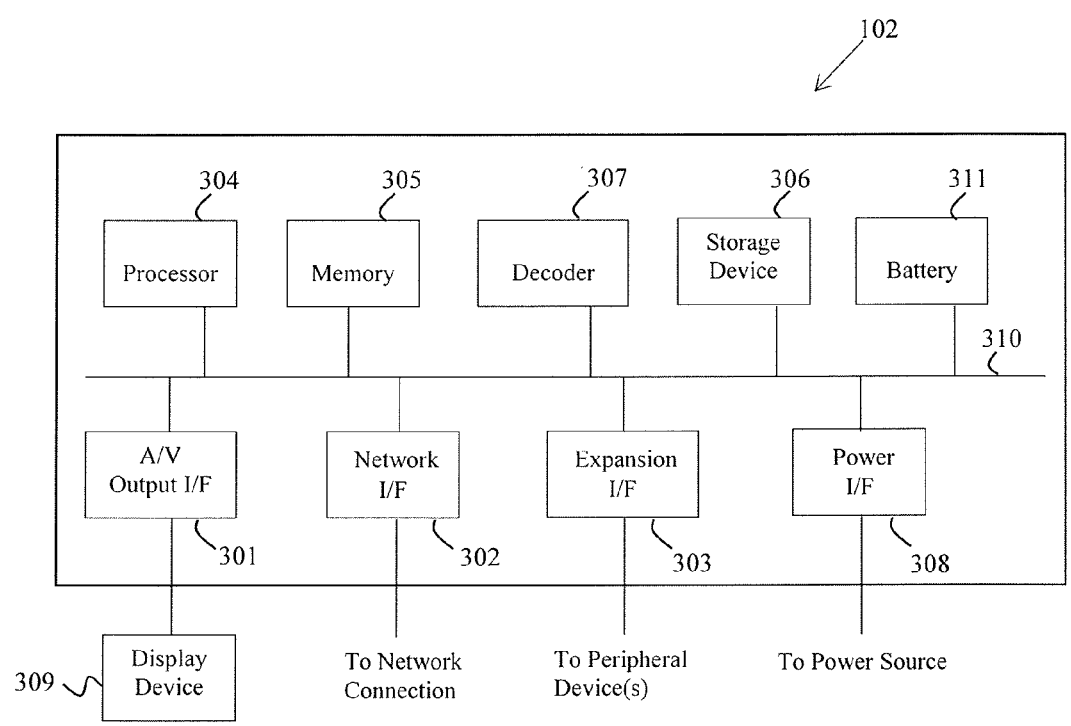
FIG. 3 is a block diagram showing a receiver unit according to an exemplary embodiment of the present invention.

FIG. 3 is a block diagram showing the receiver unit according to an exemplary embodiment of the present invention.

Referring to FIG. 3, the receiver unit 102 includes various connection interfaces and components. It is to be understood that the receiver unit 102 may include some or all of the connection interfaces and components described herein, as well as additional connection interfaces and/or components.

For example, the receiver unit 102 may include an audio/video output interface 301, a network connection interface 302, and/or an expansion interface 303.

The audio/video output interface 301 may include a single connection port capable of outputting both a video signal and an audio signal, or may include a plurality of connection ports configured to separately output a video signal and an audio signal. The audio/video output interface 301 may include a standardized connection port(s), allowing the receiver unit 102 to be connected to a standard display device 309 to display multimedia data, resulting in a high level of compatibility both in the United States and abroad. For example, the audio/video output interface 301 may include a serial digital interface (SDI) port such as a high-definition serial digital interface (HD-SDI) port, allowing the receiver unit 102 to be connected to broadcast industry standard equipment that receives an HD-SDI signal, which may include both a video signal and an audio signal. The audio/video output interface 301 may further include a high-definition multimedia interface (HDMI) port, allowing the receiver unit 102 to be connected to a variety of devices that receive an HDMI signal, which may include both a video signal and an audio signal. The audio/video output interface 301 may further include, for example, a video graphics array (VGA) port, a digital visual interface (DVI) port, component video ports, and/or RCA audio/video ports, although the audio/video output interface 301 is not limited thereto.

The network connection interface 302 may include an Ethernet port and/or a wireless network connection interface (e.g., utilizing the 802.11 standard), allowing the receiver unit 102 to connect to the Internet and/or a LAN via a wired connection or wirelessly.

The expansion interface 303 may include a variety of communication ports allowing the receiver unit 102 to connect to various peripheral devices. For example, the expansion interface 303 may include a universal serial bus (USB) port allowing the receiver unit 102 to connect to a computing device, and/or an XLR port allowing the receiver unit 102 to connect to professional audio/video equipment. The expansion interface 303 may be utilized, for example, to implement IFB during transmission, as described in further detail below.

The receiver unit 102 further includes a processor 304, a memory 305, a storage device 306 and/or a decoder 307. The processor 304, memory 305 and storage device 306 are utilized to implement a communications program to communicate the multimedia data, as described in further detail below. The decoder 307 decodes the multimedia data received from the transmitter unit 101 via the network connection interface 302. Once decoded, the multimedia data may be output to and displayed by the display device 309 via the audio/video output interface 301.

The receiver 102 further includes a power interface 308. The power interface 308 is configured to receive power from a standard AC power source, including, for example, power sources having a voltage output between 100 V and 240 V and a frequency between 50 Hz and 60 Hz, allowing the receiver unit 102 to be operated in any country. The receiver unit 102 may also receive power via a battery 311. The components of the receiver unit 102 are connected to and communicate with each other via a bus 310.

The transmitter unit 101 and the receiver unit 102 may each be constructed within a ruggedized case, allowing the units to be conveniently shipped to and from customers and moved between different sites without being damaged.

The administration server 103 facilitates the transmission of the multimedia data. That is, when multimedia data is to be transmitted from the transmitter unit 101 to the receiver unit 102, upon the transmitter and receiver units 101 and 102 establishing a connection to the administration server 103, the administration server 103 automatically establishes a connection (e.g., creates a transmission link) between the units without user intervention. Herein, when a connection between a transmitter/receiver unit 101/102 and the administration server 103 or a connection between transmitter and receiver units 101 and 102 is referred to as being established automatically without user intervention, it is to be understood that the only action taken by the user using the transmitter unit 101 and the user using the receiver unit 102 to establish the respective connections is to connect the units to power and connect the units to the Internet—no other action is required to be taken by the users to establish the respective connections.

In addition to facilitating the transmission of the multimedia data, the administration server 103 manages (e.g., configures) transmission properties of the multimedia data. That is, the administration server automatically manages properties such as, for example, bitrate, video resolution, etc. relating to the transmission of the multimedia data. Both the facilitation of multimedia data transmission and the management of transmission properties of multimedia data are described in further detail below. Coupled with the plug and play functionality of the transmitter unit 101 and the receiver unit 102, exemplary embodiments of the present invention provide a system that allows clients to conveniently transmit and receive high quality multimedia data having low latency.

The administration server 103 manages connections between a plurality of transmitter units 101 and receiver units 102. Each transmitter unit 101 connected to the administration server 103 may be configured by the administration server 103 to be connected to at least one receiver unit 102. Configuration of the transmitter and receiver units 101 and 102 may include an administrator pre-setting certain settings and properties before transmission of multimedia data, as described further below. Herein, when a transmitter unit 101 and a receiver unit(s) 102 are connected to each other by the administration server 103 (e.g., when a connection is established between a transmitter unit 101 and a receiver unit(s) 102), the connected transmitter unit 101 and receiver unit(s) 102 may be referred to as being associated with each other.

The administration server 103 may implement a one-to-one communication mode between a single transmitter unit 101 and a single associated receiver unit 102. In the one-to-one communication mode, the receiver unit 102 associated with the transmitter unit 101 is the only receiver unit 102 that receives the multimedia data transmitted by the transmitter unit 101. Alternatively, the administration server 103 may implement a broadcast communication mode between a single transmitter unit 101 and a plurality of receiver units 101. In the broadcast communication mode, the transmitter unit 101 transmits the same multimedia data to the plurality of associated receiver units 102. Transmission of the multimedia data in both the one-to-one communication mode and the broadcast mode may be in real-time or may be time-shifted, as described in further detail below.

The transmitter unit 101 and the receiver unit 102 each have a unique identification (ID) code. The unique ID codes may be any type of indicia (e.g., any combination of characters including letters, numbers, symbols, etc.) that uniquely identify the transmitter unit 101 and the receiver unit 102 from other units connected to the administration server 103. The unique ID codes for all transmitter units 101 and receiver units 102 may be stored in a database disposed, for example, at the administration server 103.

As described above, the transmitter unit 101 and the receiver unit 102 implement plug and play functionality. For example, in an exemplary embodiment, upon detecting an Internet connection, the transmitter unit 101 and the receiver unit 102 automatically initiate and establish contact with the administration server 103 without any client intervention. That is, once the client powers on a transmitter/receiver unit 101/102 and connects the unit to the Internet, no further client intervention is required to establish the connection between the transmitter unit 101 and the receiver unit 102 to begin communicating multimedia data.

Facilitating the transmission of multimedia data includes the utilization of channels by the administration server 103. For example, an associated transmitter unit 101 and receiver unit(s) 102 are assigned a same unique channel by the administration server 103 based on the ID codes of the associated units. According to exemplary embodiments, the channel may be pre-assigned to the associated units prior to any of the associated units connecting to the administration server 103 (e.g., the channel may be reserved for the associated units), the channel may be assigned to the associated units upon one of the associated units connecting to the administration server 103, or the channel may be assigned to the associated units upon all of the associated units connecting to the administration server 103. Assigning a channel to associated transmitter and receiver units 101 and 102 allows multimedia data to be communicated between the associated units without interfering with other multimedia data being communicated between other associated units on other channels. For example, each transmitter unit 101 connected to the administration server 103 may be assigned a different channel, and receiver units 102 associated with different transmitter units 101 are assigned to the same channel as their associated transmitter unit 101. Thus, the administration server 103 enables a plurality of connected transmitter units 101 to communicate different multimedia data to different receiver units 102 simultaneously.

Once associated transmitter and receiver units 101 and 102 have established a connection to the administration server 103, the administration server 103 may facilitate transmission of multimedia data between the associated units using the assigned channel. Facilitating transmission of multimedia data between transmitter and receiver units 101 and 102 may be implemented in a variety of manners.

For example, the administration server 103 may facilitate multimedia data transmission using a one-to-one communication mode. In this mode, multimedia data is communicated from a single transmitter unit 101 to a single receiver unit 102. For example, the transmitter unit 101 first receives multimedia data from the attached capture device 209. This multimedia data is then encoded by the encoder 207, and transmitted to the administration server 103. The administration server 103 may then transmit the encoded multimedia data to the receiver unit 103, which may then decode the multimedia data via its decoder 307 and display the multimedia data on the attached display device 309. The one-to-one communication mode may be a live mode, in which the multimedia data is communicated between the associated transmitter and receiver units 101 and 102 in real-time. Alternatively, the one-to-one communication mode may be implemented using time-shifting. For example, the multimedia data may be communicated from the transmitter unit 101 to the administration server 103 at a first time. The data may be stored at the administration server 103, for example, in a storage database of the administration server 103, and may then be transmitted to the receiver unit 102 at a later specified time.

The administration server 103 may also facilitate multimedia data using a broadcast mode. In this mode, multimedia data is communicated from a single transmitter unit 101 to multiple receiver units 102. For example, the transmitter unit 101 first receives multimedia data from the attached capture device 209. This multimedia data is then encoded by the encoder 207, and transmitted to the administration server 103. The administration server 103 may then transmit the encoded multimedia data to the associated receiver units 103, each of which may then decode the multimedia data via their respective decoders 307 and display the multimedia data on their respectively attached display devices 309. The broadcast mode may be a live mode, in which the multimedia data is communicated between the associated transmitter and receiver units 101 and 102 in real-time. Alternatively, the broadcast communication mode may be implemented using time-shifting. For example, the multimedia data may be communicated from the transmitter unit 101 to the administration server 103 at a certain time. The data may be stored at the administration server 103, for example, in the storage database of the administration server 103, and may then be transmitted to different associated receiver units 102 at different specified times. Using time-shifting in conjunction with the broadcast communication mode allows, for example, multimedia data to be transmitted to receiver units 102 located in different time zones in a synchronized manner (e.g., a program may be received at both a receiver unit 102 in New York and a receiver unit 102 in California at 8:00 pm local time). When utilizing time-shifting in the broadcast communication mode, the multimedia data may be received live at certain associated receiver units 102 and/or delayed at certain associated receiver units 102.

In addition to facilitating the transmission of multimedia data between associated transmitter and receiver units 101 and 102, as described above, the administration server 103 manages (e.g., configures) the transmission properties of the multimedia data. Management/configuration of the transmission properties may be based on, for example, a combination of two factors—the quality (e.g., the speed, latency, etc. of the network connection) of the network connection of the units and/or customer-specific settings selected based on a customer's specific needs relating to the transmission (e.g., pre-set transmission settings relating to the multimedia data such as, for example, desired bitrate, desired latency, desired resolution, etc.). Managing/configuring the transmission properties based on the quality of the network connection of the units may be automatically implemented by the administration server 103 using, for example, algorithms that utilize results of a network status test performed for each transmitter/receiver unit 101/102, as described further below. Managing/configuring the transmission properties based on customer-specific settings may be implemented by an administrator accessing the administration server 103 pre-setting certain transmission properties (e.g., a starting bitrate of the multimedia data, a minimum bitrate of the multimedia data, a maximum bitrate of the multimedia data, a compression type of the multimedia data, a maximum latency value of the multimedia data, etc.) before the multimedia data is communicated.

For example, in an exemplary embodiment, the administration server 103 performs a network status test for each transmitter/receiver unit 101/102 automatically upon the unit(s) establishing a connection with the administration server 103. The network status test is performed automatically by the administration server 103 without any intervention from the clients. The network status test indicates the quality and properties of the Internet connection of each transmitter/receiver unit 101/102 connected to the administration server 103. The network status test may indicate, for example, the available bandwidth of each Internet connection, specific network settings of each Internet connection (e.g., whether certain ports are blocked and unavailable for use by the connected transmitter/receiver unit 101/102), etc.

The administration server 103 may use the information obtained from the network status test to automatically and efficiently manage the transmission properties of multimedia data being communicated between the transmitter unit 101 and the receiver unit(s) 102, without any intervention of the clients using the transmitter and receiver units 101 and 102. Managing transmission properties of the multimedia may be based on, for example, the quality of the Internet connection of each unit, the type of multimedia data being communicated, and/or certain transmission requirements (e.g., pre-set transmission settings), which may be manually set by the administrator prior to communicating the multimedia data.

Managing transmission properties includes, for example, setting a starting, minimum, and/or maximum bitrate of the multimedia data, setting a compression type of the multimedia data, setting latency requirements for the multimedia data, selecting codecs and encoding/decoding options, selecting frame sampling and resolution, etc. The transmission properties for audio and video data included in the multimedia data may be managed separately. In addition to performing the initial network status test and pre-setting initial transmission settings upon the transmitter and receiver units 101 and 102, the transmission properties may also be dynamically managed by the administration server 103 in real-time to account for changes in the network connection of each unit, and to allow for pre-set transmission settings to be updated during transmission of the multimedia data.

As described above, transmission properties of the multimedia data may be based on a variety of factors, including pre-set transmission settings corresponding to transmission requirements chosen by the client. These pre-set transmission settings may relate to audio/video requirements specific to different types of multimedia data and/or the needs of different customers. For example, when communication is one-way, available bandwidth may be dedicated to video quality and there may be less concern regarding latency. However, when communication is two-way (e.g., when interactivity exists), emphasis may be placed on utilizing the available bandwidth to achieve low latency, with less concern for video quality.

Facilitation and management of the transmission of multimedia data between the transmitter unit 101 and the receiver unit(s) 102 may be implemented via a dashboard of the administration server 103. The dashboard may be accessed locally (e.g., at the same location that the administration server 103 is located via a local connection) and/or remotely via an Internet connection.

Utilization of the dashboard to facilitate and manage the transmission of multimedia data between the transmitter unit 101 and the receiver unit(s) 102 may be performed by a system administrator, and may be performed prior to and/or during communication between the transmitter unit 101 and the receiver unit(s) 102 occurring. For example, as described above, exemplary embodiments of the present invention provide a system and method that utilize plug and play functionality to communicate high quality multimedia data without intervention from the customer. This may be accomplished by a system administrator pre-setting certain transmission settings for a certain customer/stream before the communication of multimedia data occurs, allowing the communication of multimedia data to automatically commence upon the transmitter unit 101 and the receiver unit(s) 102 establishing a connection to the administration server 102. In addition, information obtained from the network status test may also be utilized to dynamically adjust transmission properties within the pre-set constraints set by the system administrator, as described above.

FIGS. 4A-4F show different pages of the dashboard, according to exemplary embodiments of the present invention.

Upon first accessing the dashboard, a user is requested to enter his/her credentials. Different users may have different levels of access to the dashboard, and may be presented with different options based on their respective levels of access upon logging in to the dashboard. For example, administrators have administrator-level access and clients have client-level access. Further, different types of clients may have different types of client-level access, and different types of administrators may have different types of administrator-level access (e.g., regular administrator access or super administrator access). For example, a client that owns transmitter and receiver unit(s) 101 and 102 and/or uses them frequently may be granted a higher level of access than a client that is renting transmitter and receiver unit(s) 101 and 102 for a single event, since the client that owns his/her own equipment presumably has a better of understanding of his/her network limitations, transmission requirements for the type of multimedia data being communicated, etc.

Figure 4A:
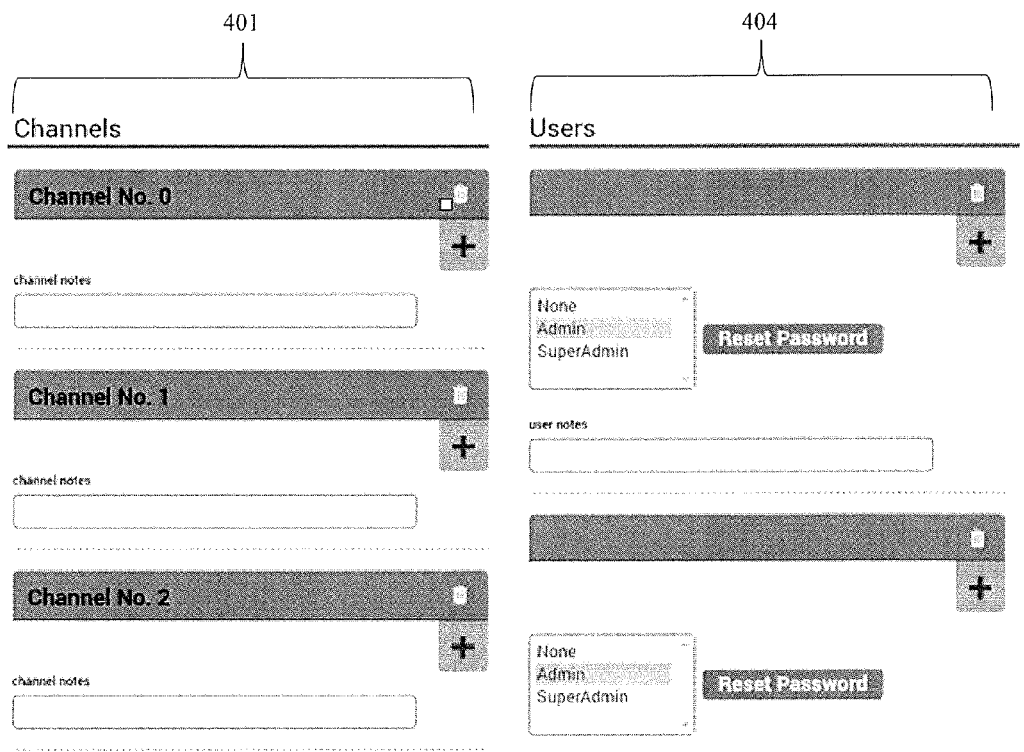
Figure 4B:
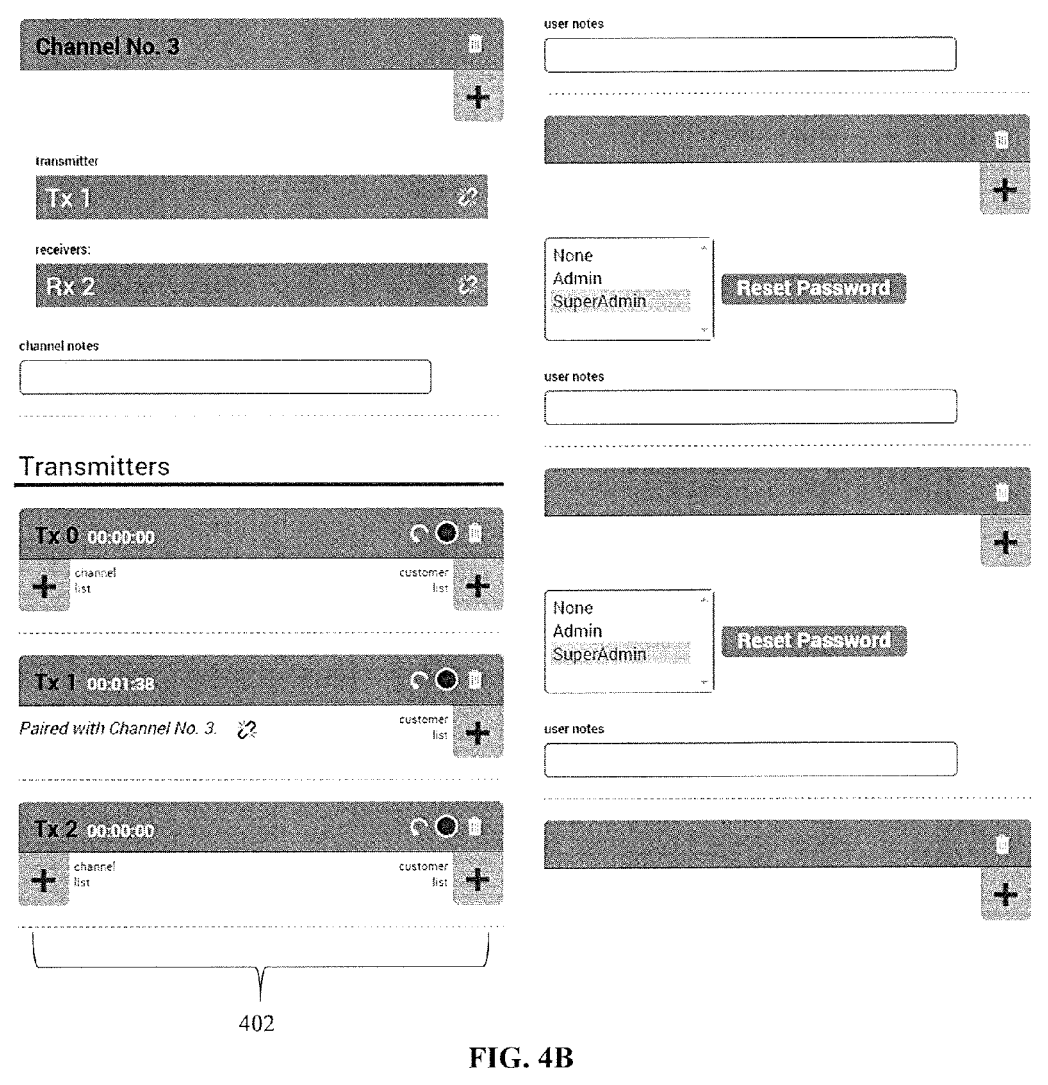
Figure 4C:
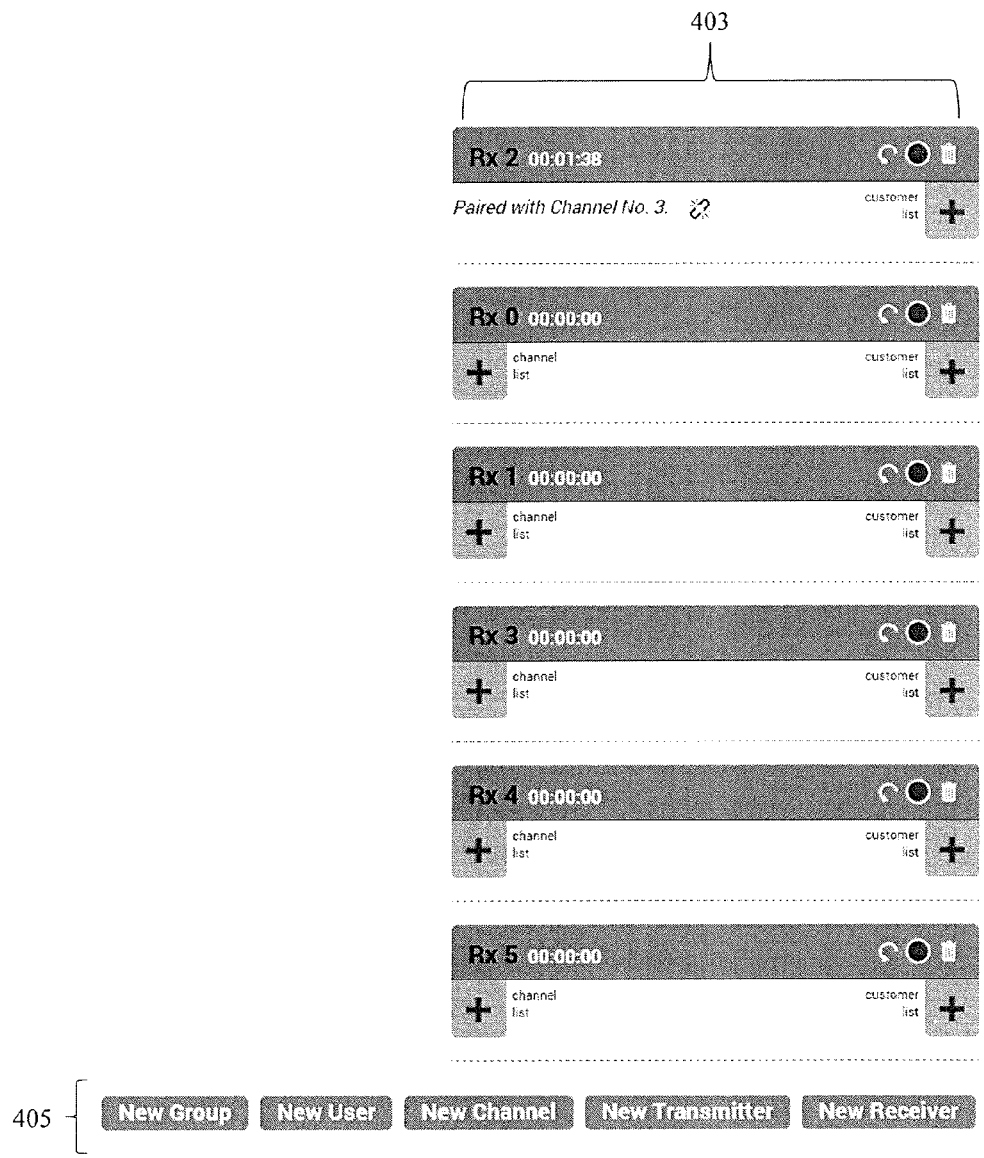

When an administrator having administrator-level access logs in to the dashboard, the administrator may access configuration options allowing the administrator to facilitate the transmission of multimedia data and manage/configure transmission properties of multimedia data for the transmitter and receiver unit(s) 101 and 102. For example, upon logging in to the dashboard, the administrator may select a customer's account to manage. An exemplary customer account page is shown in FIGS. 4A-4C.

The customer account page may present the administrator with a list of channels 401 associated with the customer. The list of channels 401 shows the administrators which transmitter and receiver units 101 and 102 are currently associated with the respective channels. In the example shown in FIGS. 4A-4C, channels 0, 1 and 2 do not currently have any transmitter and receiver units 101 and 102 associated therewith, and channel 3 currently has transmitter unit 101 Tx1 and receiver unit 102 Rx2 associated therewith. The administrator may add and remove transmitter and receiver units 101 and 102 to and from the different channels.

The customer account page may further present the administrator with a list 402 of transmitter units 101 and a list 403 of receiver units 101 and 102 associated with the customer. In the example shown in FIGS. 4A-4C, it can be seen that the customer has three transmitter units 101 Tx0, Tx1 and Tx2 associated with his/her account (see FIG. 4B), and has six receiver units 102 Rx0, Rx1, Rx2, Rx3, Rx4 and Rx5 associated with his/her account (see FIG. 4C). The customer account page shows whether each transmitter/receiver unit 101/102 is currently assigned to a channel. For example, as shown in FIGS. 4B-4C, the transmitter unit 101 Tx1 is currently assigned to channel 3, and the receiver unit 102 Rx2 is also currently assigned to channel 3. Thus, the transmitter unit 101 Tx1 and the receiver unit 102 Rx2 are currently configured to communicate data with each other via channel 3. Transmitter and receiver units 101 and 102 may be added and removed to and from a customer account page by the administrator via, for example, controls 405.

The customer account page may further present the administrator with a list of users 404 associated with the customer. The users may correspond, for example, to different employees of the customer, and may have different access levels assigned thereto. Users may be added and removed to and from a customer account by the administrator via, for example, controls 405. The administrator may also create groups of transmitter units 101, receiver units 102, channels, and/or users via controls 405.

Figure 4D:

In addition to accessing a specific customer account page, the administrator may access a configuration overview page, as shown in FIG. 4D. The configuration overview page presents the administrator with a list of active channels 406 and a list of available channels 407. Each active channel indicates to the administrator which channels are currently linked to which transmitter and receiver units 101 and 102. Each available channel indicates to the administrator which channels are currently not linked to any transmitter and receiver units 101 and 102. The administrator may add or remove transmitter and receiver unit(s) 101 and 102 to and from different channels as needed. The list of channels is dynamic, and may be increased/decreased based on current demand. Utilizing the configuration overview page instead of specific customer account pages allows the administrator to view the usage and availability of all channels, transmitter units 101 and receiver units 102 of the system regardless of which customers are using which channels, transmitter units 101 and receiver units 102.

A channel may be assigned to transmitter and receiver unit(s) 101 and 102 at a variety of different times by a system administrator. For example, it may be known in advance that a certain transmitter unit 101 and a certain receiver unit(s) 102 will be associated with each other, e.g., in the case of a customer renting the units in advance to broadcast a specific event. In this case, a channel may be assigned to the transmitter unit 101 and the receiver unit(s) 102 in advance, before the units are sent to the customer. For example, if a transmitter unit 101 having ID code TX0001 and receiver units 102 having ID codes RX0001, RX0002, and RX0003 are sent to a customer for an event in which a transmitter unit 101 is intended to transmit multimedia data to three receiver units 102, a channel (e.g., CH0001) may be assigned to the transmitter unit 101 having the ID code TX0001 and the receiver units 102 respectively having the ID codes RX0001, RX0002, and RX0003 at the time of shipping the units to the customer. In this case, when each of these units establishes a connection with the administration server 103, each unit is automatically assigned to channel CH0001.

In addition, the transmitter unit 101 and the receiver unit(s) 102 may be re-assigned to different channels at any time by a system administrator. For example, a customer that frequently uses the system to communicate multimedia data may own his/her own transmitter and receiver unit(s) 101 and 102. In this case, the customer may wish to change the associated transmitter and receiver unit(s) 101 and 102 for different events. In this case, the customer may contact a system administrator to schedule an event. For example, the customer may contact a system administrator requesting that a first event be scheduled for a certain day and time for a transmitter unit 101 having an ID code TX0002 to communicate data to receiver units 102 respectively having ID codes RX0004 and RX0005, and requesting that a second event be scheduled for a different day and time for the transmitter unit 101 having the ID code TX0002 to communicate data to receiver units 102 respectively having ID codes RX0006, RX0007, and RX0008.

According to exemplary embodiments, the unique ID codes of the transmitter and receiver units 101 and 102 may be mapped to secondary unique ID codes. The secondary unique ID codes may be more easily decipherable by a user (e.g., an administrator managing the administration server 103). For example, the unique ID code of a unit may include a long string of characters, as described above. To allow a user (e.g., a system administrator) to more easily identify different transmitter and receiver units 101 and 102, this long string of characters may be mapped to a more manageable secondary ID code such as, for example, the ID codes TX0001, TX0002, etc., and RX0001, RX0002, RX0003, etc. as described above. Creation and/or mapping of the secondary unique ID codes may be implemented at the administration server 103 or at each transmitter/receiver unit 101/102. For example, in an exemplary embodiment, upon an administrator connecting the administration server 103, the administrator may be presented with an option allowing the user to assign secondary unique ID codes to the transmitter and receiver units 101 and 102.

The administrator may assign specific transmitter and receiver units 101 and 102 to specific channels. Exemplary embodiments may utilize customer groups to organize the transmitter and receiver units 101 and 102. For example, a customer group may be created for each customer registered in the system. Every transmitter unit 101 and receiver unit 102 for a customer may be linked to that customer's customer group. For example, if a company Acme Corporation has one transmitter unit 101 (e.g., TX0001) and four receiver units 102 (e.g., RX0001, RX0002, RX0003 and RX0004), these transmitter and receiver units 101 and 102 may be added to an Acme Corporation customer group. As a result, when an administrator is assigning a channel for a broadcast for Acme Corporation, the administrator may select the Acme Corporation's customer group for a specific channel, and the transmitter and receiver units 101 and 102 belonging to Acme Corporation will be added to that specific channel.

In an exemplary embodiment, a specific channel may be permanently assigned to specific transmitter and receiver units 101 and 102. For example, according to an exemplary embodiment, in addition to customers purchasing or renting transmitter and receiver units 101 and 102, customers may also have an option to purchase or rent channels. Purchasing or renting a channel (e.g., renting a channel for a specific time/duration) guarantees a customer that a channel will be available to him/her when needed. A customer may have his/her customer group permanently assigned to a specific channel. Alternatively, channels may be dynamically assigned and unassigned based on current network conditions.

Figure 4E:
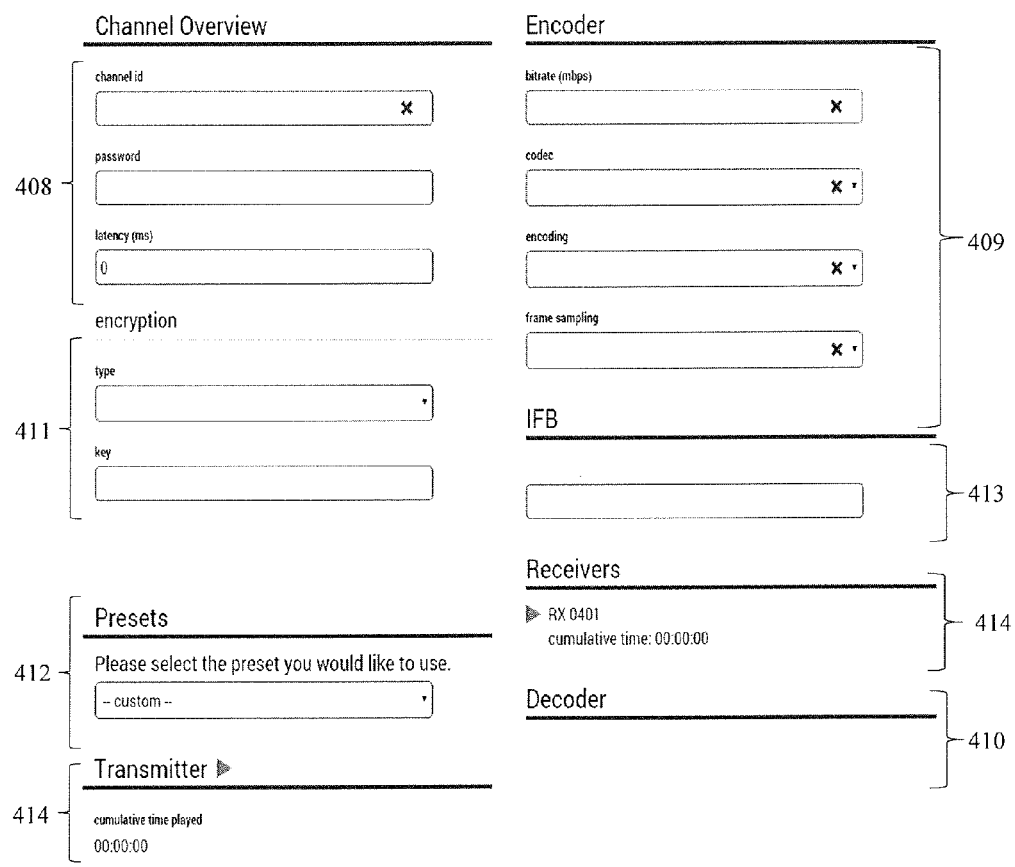

The administrator may also access a channel overview page, as shown in FIG. 4E. The channel overview page provides the administrator with transmission settings specific to each channel. The administrator may use the channel overview page to view and modify the transmission settings for each channel. The transmission settings may include, for example, basic channel settings 408 such as the channel name/ID, password, and latency. The administrator may use this section to assign an arbitrary name to the channel, set a password for accessing the channel, and/or set latency requirements (e.g., set a maximum latency) for the multimedia data communicated via the channel. The transmission settings may further include, for example, encoder settings 409 and decoder settings 410 relating to the manner in which the multimedia data communicated via the channel is being encoded/decoded. The administrator may use these sections to set the desired bitrate when communicating the multimedia data, the codecs being used when communicating the multimedia data, the encoding/decoding means being used when communicating the multimedia data, the frame sampling means being used when communicating the multimedia data, etc. The transmission settings may further include, for example, encryption settings 411 relating to the manner in which the multimedia data is encrypted and preset settings 412 allowing for certain configurations to be saved and re-used. The transmission settings may further include, for example, IFB settings 413 allowing the administrator to set an IFB server to be utilized with the channel. The channel overview page may further include a list 414 of the transmitter and receiver units 101 and 102 currently associated with the channel, including an indication of the time each transmitter and receiver unit 101 and 102 has communicated multimedia data via the channel.

Each customer has his/her own unique login credentials. The customers' login credentials are linked to the transmitter and receiver units 101 and 102 associated with the customers' respective accounts. When a customer logs in to the dashboard, the customer may be presented with a client page. The client page displays any channel(s) assigned to the customer's transmitter/receiver units 101 and 102. For example, if the customer has a transmitter unit 101 TX0001 and receiver units 102 RX0001, RX0002 and RX0003 associated with each other on a first channel CH0001, and has a different transmitter unit 101 TX0002 and different receiver units 102 RX0004, RX0005 and RX0006 associated with each other on a second channel CH0002, the customer may be presented with this information.

Figure 4F:
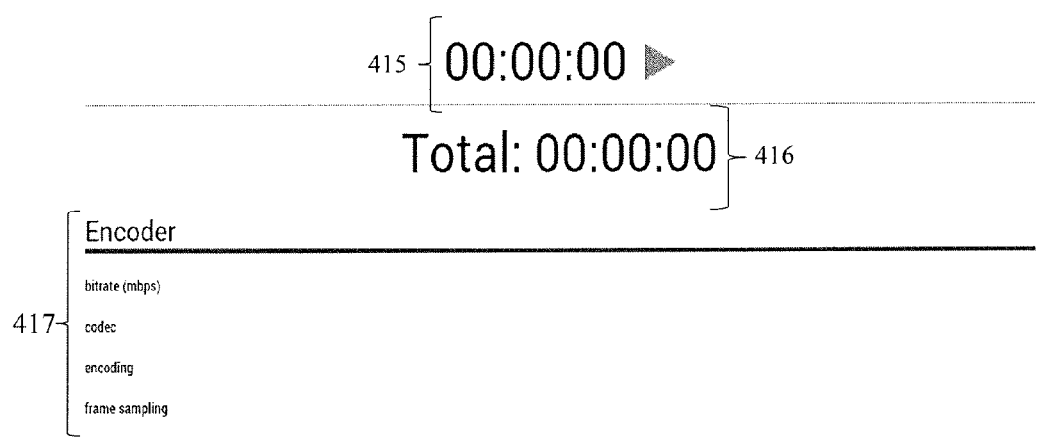

A customer may also be presented with additional information on his/her client page based on the level of access of his/her account (e.g., different customers may be granted different levels of access based on the customers' specific uses and needs). For example, the client page may display transmission properties of the customer's current stream(s) (e.g., current bitrate, average bitrate, current connection speed, average connection speed, compression type, response time, etc.). The client page may also display a start/stop control, allowing the customer to start/stop transmission of a stream, and/or a timer that indicates the current session time and/or cumulative session time, which may be beneficial for a customer if he/she is utilizing a service plan in which he/she pays based on the amount of time that multimedia data is streamed. FIG. 4F shows a transmitter/receiver unit overview page accessible by the customer. The transmitter/receiver unit overview page displays the time 415 of the current streaming session for that transmitter/receiver unit, the overall streaming time 416 for that transmitter/receiver unit, and encoder/decoder statistics 417 showing transmission statistics for that transmitter/receiver unit.

According to an exemplary embodiment of the present invention, the transmitter and receiver unit(s) 101 and 102 may be utilized on a local network without connecting to the administration server 103. This configuration may be utilized, for example, when a customer wishes to communicate multimedia data between transmitter and receiver unit(s) 101 and 102 within one location (e.g., an office building). In this embodiment, communication between the transmitter and receiver unit(s) 101 and 102 does not utilize a public Internet connection and does not utilize the administration server 103. Rather, multimedia data is communicated directly between the transmitter and receiver unit(s) 101 and 102 using only the local network connection. Directly communicating multimedia data between the transmitter and receiver unit(s) 101 and 102 without going through a public Internet connection may remove the most common bottleneck (e.g., Internet speed), allowing for the communication of multimedia data to be fast and efficient by having virtually unlimited point-to-point connections within the LAN.

When the administration server 103 is not utilized, the management of the transmission of multimedia data, as described above with relation to the administration server 103, may be implemented directly on the transmitter and receiver unit(s) 101 and 102. For example, in exemplary embodiments, the dashboard described above with relation to the administration server 103 may be implemented on the transmitter and receiver unit(s) 101 and 102. A system administrator may remotely or locally connect to the transmitter and receiver unit(s) 101 and 102 to configure the units. In addition, a mobile hotspot may be utilized with the transmitter and receiver unit(s) 101 and 102 to allow a system administrator to configure the units remotely in a situation in which the units cannot be remotely connected to via the Internet connection provided at the location of the units. For example, in many settings, restrictions placed on devices connecting to the Internet may prevent the transmitter and receiver unit(s) 101 and 102 from being remotely accessed (e.g., as the result of proxy settings, firewalls, blocked ports, etc.). In this scenario, a mobile hotspot may be utilized with the transmitter and receiver unit(s) 101 and 102 (e.g., by connecting to the expansion interfaces 203 and 303 and/or the network connection interfaces 202 and 302, or by being built into the transmitter and receiver units 101 and 102), allowing a system administrator to remotely connect to and configure the units (e.g., change the ports being utilized by the units, set proxy settings, etc.). Once configured, the units may then directly communicate multimedia data without accessing the public Internet by communicating with each other only via the LAN.

According to an exemplary embodiment of the present invention, all processing of the multimedia data may be performed at the administration server 103. For example, the administration server may include some or all of the components described above with reference to the transmitter and receiver units 101 and 102 as shown in FIGS. 2 and 3 (e.g., a processor, memory, encoder, decoder, storage device, etc.). Performing processing at the administration server 103 allows for the communication of raw unencoded high definition multimedia data between the transmitter unit 101 and the receiver unit 102.

In addition to receiving multimedia data via the receiver unit 102 described above, exemplary embodiments of the present invention may also allow for multimedia data to be received via a URL on a computing device (e.g., a personal computer, a smartphone, a tablet computer, etc.) using the customer's login credentials.

Exemplary embodiments of the present invention may utilize interruptible foldback (IFB) during the communication of multimedia data. IFB is a monitoring and cueing system typically used during one-way communication allowing a person in one location (e.g., a director) to communicate with a person in another location (e.g., on-air talent). Using IFB, audio may be fed back to on-air talent from a director using a microphone at the director's location and an earpiece at the on-air talent's location. An IFB server may be utilized to implement IFB.

Figure 5:
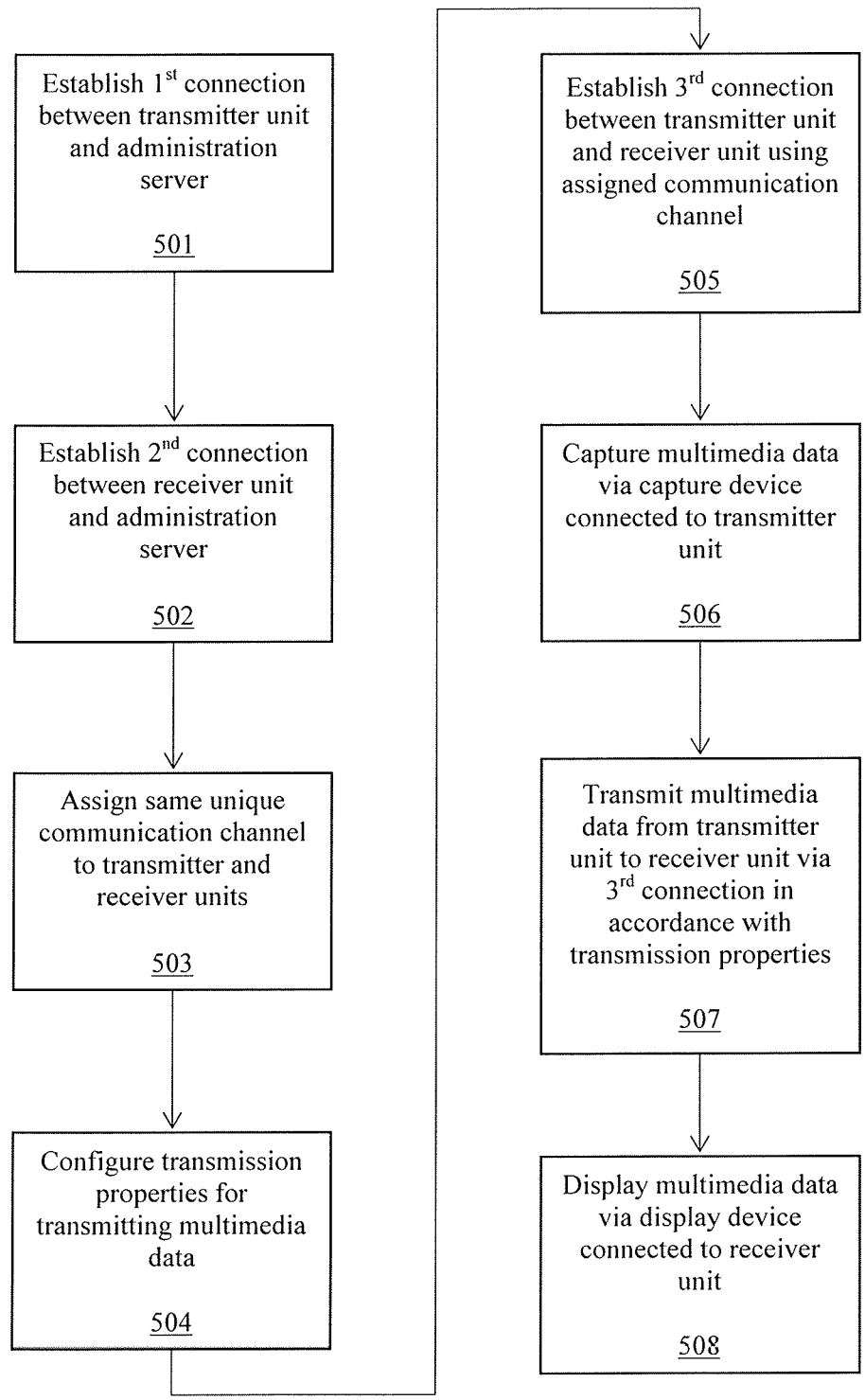
FIG. 5 is a flowchart showing a method of communicating multimedia data according to an exemplary embodiment of the present invention.

FIG. 5 is a flowchart showing a method of communicating multimedia data according to an exemplary embodiment of the present invention.

At block 501, a first connection is established between the transmitter unit 101 and the administration server 103. The transmitter unit 101 automatically initiates establishing the first connection upon being connected to the Internet. At block 502, a second connection is established between the receiver unit 102 and the administration server 103. The receiver unit automatically initiates establishing the second connection upon being connected to the Internet. At block 503, the same unique communication channel is assigned to the transmitter unit 101 and the receiver unit 102 by the administration server using the unique ID codes of the transmitter and receiver units 101 and 102.

At block 504, transmission properties (e.g., a starting bitrate of the multimedia data, a minimum bitrate of the multimedia data, a maximum bitrate of the multimedia data, a compression type of the multimedia data, a maximum latency value of the multimedia data, etc.) to be used when transmitting the multimedia data from the transmitter unit 101 to the receiver unit 102 are configured by the administration server 103. At block 505, a third connection is established between the transmitter unit 101 and the receiver unit 102 using the same unique communication channel previously assigned to the transmitter and receiver units 101 and 102 at block 503. The third connection is established automatically by the administration server 103 upon the first and second connections being established without user intervention (e.g., without the user having to modify transmission settings, log in with a user account, etc.). The third connection may be established through the administration server 103.

At block 506, the multimedia data is captured via the capture device 209 connected to the audio/video input interface 201 of the transmitter unit 101. At block 507, the multimedia data is transmitted from the transmitter unit 101 to the receiver unit 102 via the third connection in accordance with the transmission properties configured at block 504. At block 508, the multimedia data is displayed via the display device 309 connected to the audio/video output interface 301 of the receiver unit 102. It is to be understood that exemplary embodiments of the present invention may implement some or all of the blocks shown in FIG. 5.

The components of the system described herein may include, but are not limited to, one or more processors or processing units, a system memory, and a bus that couples various system components including system memory to the processor(s). The bus represents one or more of any of several types of bus structures, including a memory bus or memory controller, a peripheral bus, an accelerated graphics port, and a processor or local bus using any of a variety of bus architectures.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 6:
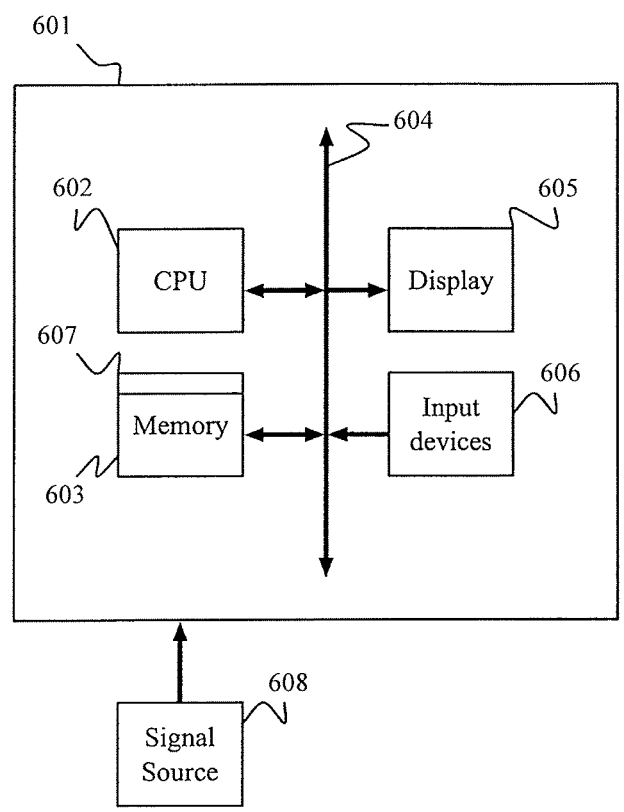
FIG. 6 illustrates a computer system for implementing aspects of exemplary embodiments of the present invention.

Referring to FIG. 6, according to an exemplary embodiment of the present invention, a computer system 601 supporting an apparatus and method for communicating high quality multimedia data via an Internet connection includes, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, or a combination thereof. The present invention can be implemented as a routine 607 that is stored in memory 603 and executed by the CPU 602 to process the signal from the signal source 608. As such, the computer system 601 is a general-purpose computer system that becomes a specific-purpose computer system when executing the routine 607 of the present invention.

The computer platform 601 also includes an operating system and micro instruction code. The various processes and functions described herein may either be part of the micro instruction code, or part of the application program (or a combination thereof), which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A method of communicating multimedia data, comprising:
    establishing a first connection between a transmitter unit and an administration server, wherein the transmitter unit automatically initiates establishing the first connection upon being connected to an Internet, and the transmitter unit has a first unique identification (ID) code that uniquely identifies the transmitter unit from other units connected to the administration server;
    establishing a second connection between a receiver unit and the administration server, wherein the receiver unit automatically initiates establishing the second connection upon being connected to the Internet, and the receiver unit has a second unique ID code that uniquely identifies the receiver unit from the other units connected to the administration server;
    assigning a same unique communication channel to the transmitter unit and the receiver unit, by the administration server, using the first and second unique ID codes;
    configuring transmission properties, by the administration server, for transmitting the multimedia data from the transmitter unit to the receiver unit;
    establishing a third connection between the transmitter unit and the receiver unit using the same unique communication channel, by the administration server, upon the first and second connections being established;
    capturing the multimedia data via a capture device connected to an audio/video input interface of the transmitter unit;

transmitting the multimedia data from the transmitter unit to the receiver unit via the third connection in accordance with the transmission properties; and displaying the multimedia data via a display device connected to an audio/video output interface of the receiver unit, wherein the third connection is automatically established without intervention of a first user of the transmitter unit and a second user of the receiver unit, wherein the transmitter unit automatically initiates establishing the first connection in response to a first network cable being plugged into a first network connection interface of the transmitter unit, wherein the receiver unit automatically initiates establishing the second connection in response to a second network cable being plugged into a second network connection interface of the receiver unit.

2. The method of claim 1, wherein configuring the transmission properties is based on a quality of the first connection and a quality of the second connection.

3. The method of claim 2, wherein configuring the transmission properties is further based on pre-set transmission settings relating to the multimedia data.

4. The method of claim 1, further comprising:
initiating a first network status test corresponding to the first connection, automatically by the administration server, upon establishing the first connection; and
initiating a second network status test corresponding to the second connection, automatically by the administration server, upon establishing the second connection.

5. The method of claim 4, wherein configuring the transmission properties is based on the first and second network status tests.

6. The method of claim 5, wherein configuring the transmission properties comprises at least one of setting a starting bitrate of the multimedia data, setting a minimum bitrate of the multimedia data, setting a maximum bitrate of the multimedia data, setting a compression type of the multimedia data, and setting a maximum latency value of the multimedia data.

7. The method of claim 4, wherein the first network status test indicates to the administration server a first Internet connection speed currently available to the transmitter unit, and the second network status test indicates to the administration server a second Internet connection speed currently available to the receiver unit.

8. The method of claim 4, wherein the first network status test indicates to the administration server whether access to any communication ports relating to the first connection is prohibited to the transmitter unit, and whether access to any communication ports relating to the second connection is prohibited to the receiver unit.

9. The method of claim 1, wherein the capture device and the display device are respectively connected to the transmitter unit and the receiver unit via one of a high-definition serial digital interface (HD-SDI) connection and a high-definition multimedia interface (HDMI) connection.

10. The method of claim 1, wherein the same unique communication channel is assigned to the transmitter unit and the receiver unit prior to establishing the first and second connections.

11. The method of claim 1, wherein the same unique communication channel is assigned to the transmitter unit and the receiver unit at substantially a same time as establishing the first and second connections.

12. The method of claim 1, further comprising:
initiating a timer, at the administration server, that tracks an amount of time that the multimedia data is transmitted from the transmitter unit to the receiver unit.

13. The method of claim 1, further comprising:
pre-setting a start time and an end time for transmitting the multimedia data from the transmitter unit to the receiver unit.

14. The method of claim 1, wherein the receiver unit is a first receiver unit, and the method further comprises:
transmitting the multimedia data to the first receiver unit at a first time; and
transmitting the multimedia data to a second receiver unit at a second time, different from the first time.

15. A system of communicating multimedia data, comprising:
a transmitter having a first unique identification (ID) code that uniquely identifies the transmitter from other transmitters and receivers connected to an administration server, wherein the transmitter comprises:
an audio/video input interface that connects to a capture device, wherein the capture device captures the multimedia data;
an encoder that encodes the multimedia data; and
a first network adapter that establishes a first connection between the transmitter and the administration server, wherein the transmitter automatically initiates establishing the first connection in response to a first network cable being plugged into the first network adapter;

a receiver having a second unique ID code that uniquely identifies the receiver from the other transmitters and receivers connected to the administration server, wherein the receiver comprises:
an audio/video output interface that connects to a display device, wherein the display device displays the multimedia data;
a decoder that decodes the multimedia data; and
a second network adapter that establishes a second connection between the receiver and the administration server, wherein the receiver automatically initiates establishing the second connection in response to a second network cable being plugged into the second network adapter; and the administration server, wherein the administration server:
assigns a same unique communication channel to the transmitter and the receiver using the first and second unique ID codes;
configures transmission properties for transmitting the multimedia data from the transmitter to the receiver; and
establishes a third connection between the transmitter and the receiver using the same unique communication channel upon the first and second connections being established without intervention of a first user of the transmitter and a second user of the receiver,
wherein the multimedia data is transmitted from the transmitter to the receiver via the third connection in accordance with the transmission properties.

16. The system of claim 15, wherein the transmission properties are configured based on a quality of the first connection and a quality of the second connection.

17. The system of claim 16, wherein the transmission properties are further configured based on pre-set transmission settings relating to the multimedia data.

18. The system of claim 15, wherein the administration server further:
- initiates, automatically, a first network status test corresponding to the first connection upon establishing the first connection; and
- initiates, automatically, a second network status test corresponding to the second connection upon establishing the second connection.

19. The system of claim 18, wherein the transmission properties are configured based on the first and second network status tests.

20. The system of claim 15, wherein each of the audio/video input interface and the audio/video output interface comprises one of a high-definition serial digital interface (HD-SDI) port and a high-definition multimedia interface (HDMI) port.

\* \* \* \* \*